US009363207B2

(12) United States Patent
Mittal et al.

(10) Patent No.: US 9,363,207 B2
(45) Date of Patent: Jun. 7, 2016

(54) PRIVATE VIRTUAL LOCAL AREA NETWORK ISOLATION

(75) Inventors: Anuraag Mittal, San Jose, CA (US); Huei-Ping Chen, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 663 days.

(21) Appl. No.: 13/135,081

(22) Filed: Jun. 24, 2011

(65) Prior Publication Data

US 2012/0331142 A1 Dec. 27, 2012

(51) Int. Cl.
| G06F 15/173 | (2006.01) |
| G06F 15/177 | (2006.01) |
| H04L 12/28 | (2006.01) |
| H04L 12/931 | (2013.01) |
| H04L 12/46 | (2006.01) |
| H04L 29/12 | (2006.01) |

(52) U.S. Cl.
CPC .......... *H04L 49/354* (2013.01); *H04L 12/4641* (2013.01); *H04L 61/2038* (2013.01); *H04L 61/6022* (2013.01)

(58) Field of Classification Search
CPC .... H04L 12/4641; H04L 49/25; H04L 49/354
USPC .................. 709/217, 218, 220, 225, 249, 250
See application file for complete search history.

(56) References Cited

U.S. PATENT DOCUMENTS

| 5,878,232 | A | * | 3/1999 | Marimuthu .................... 709/249 |
| 5,959,989 | A | | 9/1999 | Gleeson et al. |
| 6,304,901 | B1 | | 10/2001 | McCloghrie et al. |
| 6,741,592 | B1 | | 5/2004 | Edsall et al. |
| 6,765,914 | B1 | * | 7/2004 | Jain et al. ................. 370/395.31 |
| 6,914,905 | B1 | * | 7/2005 | Yip et al. .................. 370/395.53 |
| 7,551,559 | B1 | * | 6/2009 | Jonnala et al. ................. 370/230 |
| 7,606,939 | B1 | * | 10/2009 | Finn ................................ 709/246 |
| 7,633,956 | B1 | * | 12/2009 | Parandekar et al. .......... 370/401 |
| 7,693,158 | B1 | * | 4/2010 | Carrie ....................... 370/395.53 |
| 7,957,388 | B2 | * | 6/2011 | Medina et al. ................ 370/392 |
| 8,873,431 | B1 | * | 10/2014 | Perkinson ..................... 370/255 |
| 2002/0089992 | A1 | * | 7/2002 | Yip et al. ...................... 370/401 |
| 2002/0091795 | A1 | * | 7/2002 | Yip ..................... H04L 12/2852 709/218 |
| 2003/0056063 | A1 | * | 3/2003 | Hochmuth .......... H04L 63/0272 711/152 |
| 2006/0056297 | A1 | * | 3/2006 | Bryson ................ H04L 63/104 370/230 |
| 2006/0146835 | A1 | * | 7/2006 | Homchaudhuri et al. ......................... 370/395.53 |
| 2006/0248196 | A1 | * | 11/2006 | Iszlai et al. ..................... 709/227 |
| 2007/0011725 | A1 | * | 1/2007 | Sahay ..................... H04L 63/08 726/4 |
| 2007/0019568 | A1 | * | 1/2007 | Velupillai ........... H04L 12/4641 370/254 |

(Continued)

OTHER PUBLICATIONS

H. S. Johal, Access List Based VLAN Map Architecture and Modified 802.1q Frame Scheme for Addressing VTP Issues, IEEE conf., May 24, 2010.

(Continued)

*Primary Examiner* — Madhu Woolcock
(74) *Attorney, Agent, or Firm* — Cindy Kaplan (57) ABSTRACT

In one embodiment, a method includes obtaining addresses of end hosts at a switch, the switch configured with a primary virtual local area network and a secondary virtual local area network, creating a private virtual local area network access list comprising the addresses of end hosts permitted to communicate on the secondary virtual local area network, and applying the private virtual local area network access list to interfaces connected to the end hosts permitted to communicate on the secondary virtual local area network. An apparatus is also disclosed.

19 Claims, 4 Drawing Sheets

(56) References Cited

U.S. PATENT DOCUMENTS

| | | | |
|---|---|---|---|
| 2008/0071961 A1* | 3/2008 | Higuchi et al. ............... 710/312 |
| 2009/0303882 A1* | 12/2009 | Tanaka et al. ................. 370/237 |
| 2010/0169880 A1 | 7/2010 | Haviv et al. |
| 2011/0030032 A1 | 2/2011 | Baykal et al. |
| 2011/0142053 A1* | 6/2011 | Van Der Merwe et al. ......................... 370/395.1 |
| 2011/0274110 A1* | 11/2011 | Mmmadi et al. .............. 370/392 |
| 2011/0292939 A1* | 12/2011 | Subramaian et al. ......... 370/392 |
| 2011/0299413 A1* | 12/2011 | Chatwani et al. ............. 370/252 |
| 2011/0299534 A1* | 12/2011 | Koganti et al. ............... 370/392 |
| 2011/0299535 A1* | 12/2011 | Vobbilisetty et al. ......... 370/392 |
| 2012/0084406 A1* | 4/2012 | Kumbalimutt ................. 709/220 |
| 2012/0176893 A1* | 7/2012 | Ghanwani et al. ............ 370/230 |
| 2012/0287931 A1* | 11/2012 | Kidambi et al. .............. 370/392 |
| 2012/0287936 A1* | 11/2012 | Biswas et al. ............... 370/395.3 |
| 2013/0182722 A1* | 7/2013 | Vishveswaraiah et al. ... 370/475 |

OTHER PUBLICATIONS

Hartinder Singh Johal: "Access List Based VLAN Map Architecture and Modified 802.1q Frame Scheme for Addressing VTP Issues", SERA, 2010 Eighth ACIS, IEEE Int'l Conf., May 24, 2010.

* cited by examiner

PRIVATE VIRTUAL LOCAL AREA NETWORK ISOLATION

TECHNICAL FIELD

The present disclosure relates generally to communication networks, and more particularly, to private virtual local area network (VLAN) isolation.

BACKGROUND

Virtual local area networks (VLANs) represent a domain in which a client can send frames to any other client in the same VLAN. Private VLANs allow sharing on a single (primary VLAN) by clients on secondary VLANs. Clients on secondary VLANs can communicate with one another unless configured as an isolated VLAN. With conventional networks, if two switches terminate private VLANs, traffic that should be isolated can still make it across to the hosts behind the other switch, if both switches are configured to use the same primary VLAN. This may be prevented by configuring different primary VLANs, however, there are a number of drawbacks to this approach. For example, IP addressing changes may be required.

BRIEF DESCRIPTION OF THE DRAWINGS

Corresponding reference characters indicate corresponding parts throughout the several views of the drawings.

DESCRIPTION OF EXAMPLE EMBODIMENTS

Overview

In one embodiment, a method generally comprises obtaining addresses of end hosts at a switch, the switch configured with a primary virtual local area network and a secondary virtual local area network, creating a private virtual local area network access list comprising the addresses of end hosts permitted to communicate on the secondary virtual local area network, and applying the private virtual local area network access list to interfaces connected to the end hosts permitted to communicate on the secondary virtual local area network.

In another embodiment, an apparatus generally comprises a primary virtual local area network and a secondary virtual local area network, memory for storing a private virtual local area network access list comprising addresses of end hosts permitted to communicate on the secondary virtual local area network, and a processor for applying the private virtual local area network access list to interfaces connected to the end hosts permitted to communicate on the secondary virtual local area network.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

Private VLANs may operate as three related VLANs; primary, isolated, and community VLANs. The isolated and community VLANs are referred to as secondary VLANs. When two switches terminate private VLANs, traffic that should be isolated can still make it across to the hosts behind the other switch, if both switches are configured to use the same primary VLAN. Also, in the case of a single switch, it may be possible to circumvent the isolation provided with private VLANs. For example, if a host spoofs the MAC (media access control) address it uses to source a packet, it can send malicious frames to another interface that is on an isolated VLAN.

The embodiments described herein provide private virtual local area network isolation on the same primary VLAN across switches regardless of the configuration on upstream physical switches. As described below, the embodiments provide a management interface that eliminates a need for an administrator to re-architect deployment, reassign IP addresses to end hosts, or manually configure access control lists on a per end host basis, which can be error prone and tedious. The embodiments also allow the administrator to re-use the same configuration, including primary VLAN, which provides a reduction in the number of VLANs required and also allows a user to use a standard configuration for all of their environments, which further aids in automation. This provides ease of managing an access list construct and provides a second level of security that does not exist in conventional networks.

As described below, the private VLAN is configured on a switch. The term 'switch' as used herein may refer to a physical switch, a virtual switch installed at a network device (e.g., server), a switch domain (e.g., plurality of virtual switches installed at different servers), or any other physical or logical entity configured to perform switching or forwarding operations.

Figure 1:
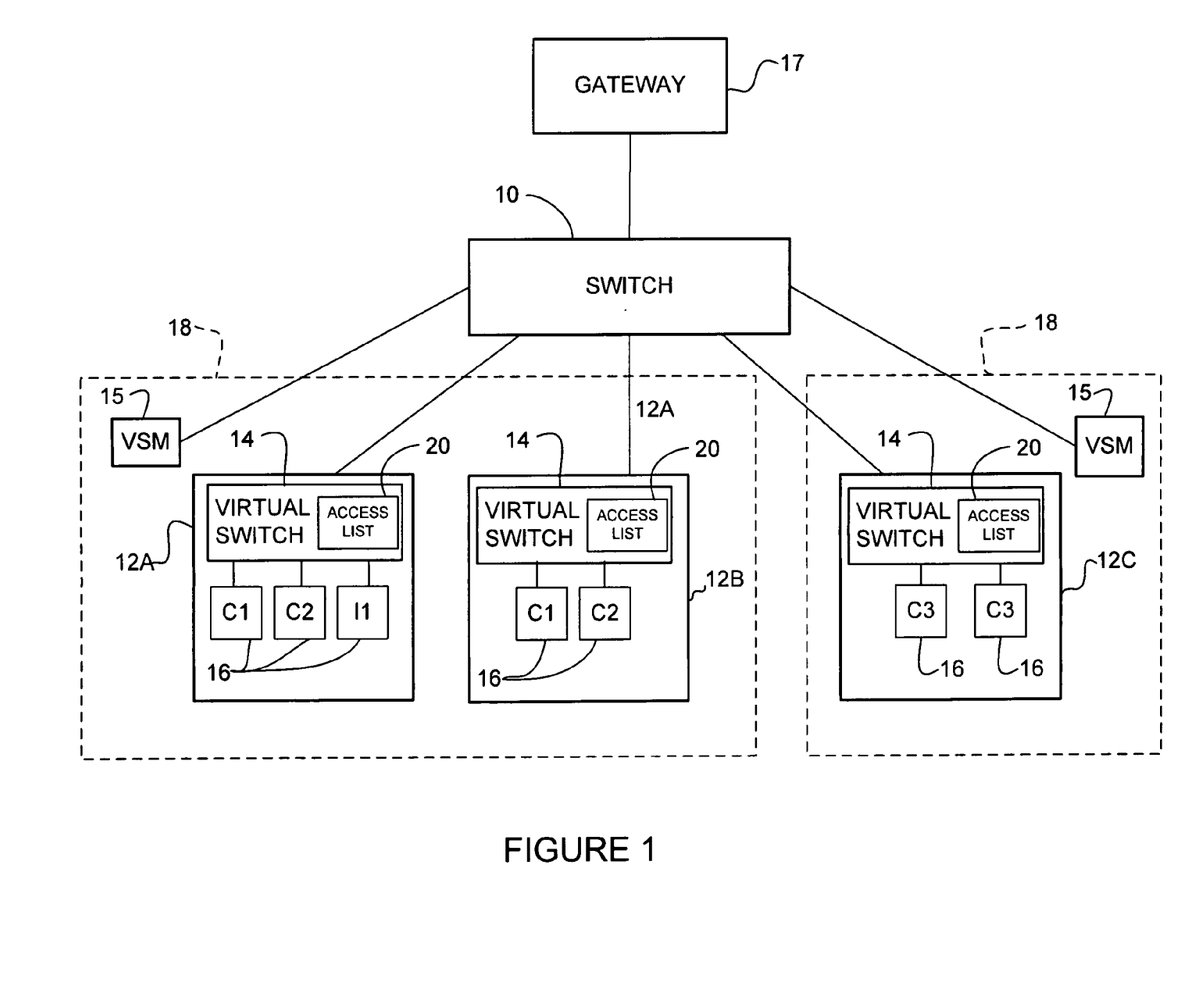
FIG. 1 illustrates an example of a network in which embodiments described herein may be implemented.

Referring now to the drawings, and first to FIG. 1, an example of a network in which embodiments described herein may be implemented is shown. The network may be configured for use as a data center or any other type of network. For simplification, only a small number of nodes are shown. The network includes a physical switch 10 in communication with a plurality of network devices (e.g., servers, hosts, physical machines) 12A, 12B, 12C, each comprising a virtual switch 14 and virtual machines (end hosts) 16. The virtual machines 16 share hardware resources without interfering with each other so that several operating systems and applications can run at the same time on a single computer. The virtual machines 16 may be used, for example, in a virtual infrastructure to dynamically map physical resources to business needs. The virtual switches 14 operate to switch traffic between virtual machines 16.

The physical switch 10 is also in communication with gateway 17, which may be in communication with any number of network devices or networks (not shown). The switch 10 may also be in communication with other network devices (e.g., switches, servers (e.g., DHCP (Dynamic Host Configuration Protocol) server), management station, router, gateway, etc.).

A virtual machine monitor such as hypervisor (not shown) dynamically allocates hardware resources to the virtual machines 16. The virtual machines 16 may be moved (referred to, for example, as vMotion, live migration, or virtual machine migration) between servers, across layer 2 or layer 3 boundaries, based on traffic patterns, hardware resources, or other criteria.

In one embodiment, the virtual switches 14 are part of a distributed virtual switch and reside in the physical hosts hosting the virtual machines 16. The distributed virtual switch includes a virtual switch component (referred to herein as a Virtual Ethernet Module (VEM)) 14 installed at the servers and a Virtual Supervisor Module (VSM) 15. The VSM 15 may be located in a physical appliance in communication with the servers via physical switch 10, or the VSM may be a virtual appliance (e.g., virtual machine) installed at one of the servers in the network. The VSM 15 is configured to provide control plane functionality for the virtual machines 16. The virtual switch 14 provides switching capability at the server and operates as a data plane associated with the control plane of the VSM 15. The VSM 15 and virtual switch (VEM) 14 operate together to form a distributed virtual switch as viewed by a management station.

In the example shown in FIG. 1, two virtual switches 14 and a VSM 15 are located in a first switch domain (switch instance) 18 and one virtual switch and VSM are located in another virtual switch domain. There may be any number of virtual switch domains 18 in communication with physical switch 10 or another switch in communication with gateway 17. In one embodiment, each switch domain 18 comprises at least one VSM 15 and any number of VEMs (virtual switches) 14. The servers 12A, 12B, 12C may include any number of virtual machines 16. Each virtual machine 16 may be associated with a primary VLAN and a secondary VLAN (e.g., community or isolated VLAN), as described below with respect to FIG. 2.

In the example shown in FIG. 1, each port at the virtual machines 16 is associated with the same primary VLAN (e.g., VLAN 100) at the physical switch 10 and gateway 17. Server 12A includes a virtual machine 16 (user, customer) associated with a first community VLAN (C1), a virtual machine associated with a second community VLAN (C2), and a virtual machine associated with an isolated VLAN (I1). Server 12B (in the same switch domain 18 as server 12A) includes a virtual machine 16 associated with the first community VLAN (C1) and a virtual machine associated with the second community VLAN (C2). Server 12C is located in a separate switch domain 18 from servers 12A and 12B, and includes two virtual machines 16 associated with a third community VLAN (C3).

In one example, community VLANs C1 and C3 located in different switch domains 18 may both be configured with the same VLAN identifier (e.g., 200). In conventional networks, when private VLANs are terminated at virtual switches configured with the same primary VLAN, traffic from a virtual machine 16 on community VLAN C1 at server 12A may be received at the virtual machines on server 12C, even though these community VLANs should be isolated. Also, on conventional networks, it may be possible for one of the virtual machines 16 to spoof the MAC address the virtual machine uses to source a packet and send traffic to a host on another private VLAN in the same virtual switch domain 18. The embodiments described herein automatically create and maintain an access list construct that restricts private VLANs configured on a switch (switch domain, switch instance) to that switch.

It some cases, it may be desired that the system operates without isolating community VLANs, as described herein. Therefore, the system may be configured such that the user can choose between a conventional implementation and the behavior described herein.

As described in detail below, each virtual switch includes a private virtual local area network access list 20 which is used to ensure that private VLANs configured on a switch are restricted to that particular switch. The private VLAN access list 20 may be implemented in software or hardware, and may use various algorithms. The private VLAN access list 20 may include, for example, MAC addresses, IPv4 or IPv6 addresses, or any other identifier. The private VLAN access list 20 described herein is only an example and it is contemplated that any construct may be used to maintain a list of identifiers that received packets can be checked against. The private VLAN access list 20 may be stored in memory allocated for virtual switch 14 at the server 12A, 12B, 12C or may be stored at the VSM 15, for example. The private VLAN access list 20 is preferably automatically generated and maintained and therefore does not need to be displayed to the user.

It is to be understood that the network shown in FIG. 1 and described herein is only one example and that the embodiments described herein may be implemented in networks having different network topologies and network devices, without departing from the scope of the embodiments. For example, different virtual switch configurations may be used or a physical switch may be used rather than a switch domain.

Figure 2:
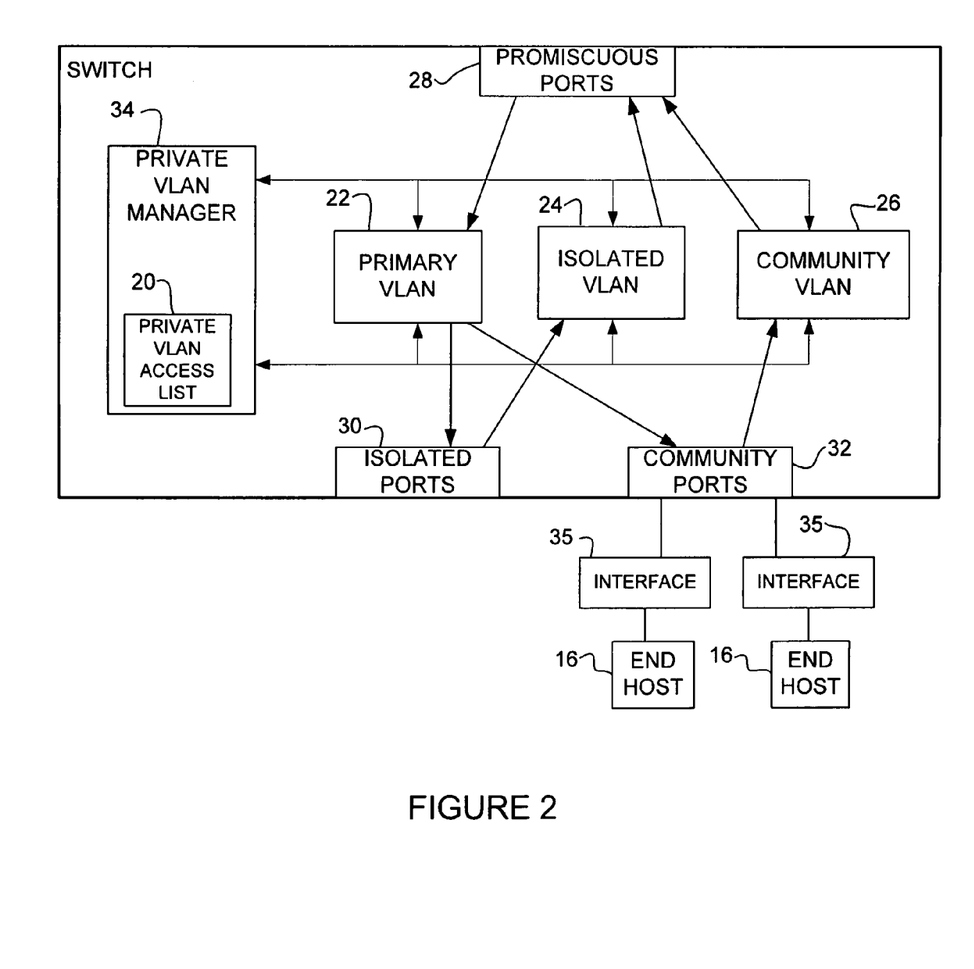
FIG. 2 is a block diagram of a switch illustrating primary, isolated, and community virtual local area networks.

FIG. 2 illustrates an example of a virtual local area network made up of three related VLANs defined within the switch (switch domain, virtual switch, physical switch). The three VLANs are primary VLAN 22, isolated VLAN 24, and community VLAN 26. As noted above, the isolated and community VLANs 24, 26 are referred to as secondary VLANs. The switch may map secondary VLANs 24, 26 to the primary VLAN 22. The switch also includes promiscuous ports 28, isolated ports 30, and community ports 32. The promiscuous ports 28 are connected to an upstream switch (e.g., physical switch 10) that may in turn connect to a network (e.g., Internet), administrative workstation, or common network server (e.g., DHCP server) (FIGS. 1 and 2). The isolated and community ports 30, 32 connect to end hosts (e.g., virtual machines or physical hosts) 16 and carry traffic for those nodes. The switch may have any number of promiscuous, isolated, or community ports 28, 30, 32. A network or system administrator may designate the port types (promiscuous, isolated, community) and assign them to the primary VLAN and corresponding secondary VLAN (isolated or community).

The primary VLAN 22 connects the promiscuous ports 28 with isolated or community ports 30, 32. The primary VLAN 22 receives packets from devices connected to the promiscuous ports 28 and transfers the packets to the isolated or community ports 30, 32.

The isolated VLAN 24 connects isolated ports 30 to promiscuous ports 28. A private VLAN manager 34 maps traffic to the primary VLAN. The traffic is only one way in the isolated VLAN 24. Packets are received at an isolated port 30 and travel from that isolated port to a promiscuous port 28. Packets are not available to other isolated or community ports 30, 32.

The community VLAN 26 connects community ports 32 to promiscuous ports 28. The community VLAN 26 is a one way connection from a community of ports 32 to the promiscuous ports 28, but allows a packet received by one community port to be transmitted out of the switch through the other community ports connected to that community VLAN. There may be any number of separate community VLANs on the switch. Packets do not travel from a community port 32 to isolated ports 30 or to community ports for a different community VLAN that may exist on the same switch. The switch also includes a private VLAN manager 34 and the private VLAN access list 20.

In the example shown in FIG. 2, two end hosts 16 are connected to the switch through interfaces 35. The interfaces 35 may physically connect the end hosts 16 to a physical switch or virtual interfaces may logically connect virtual machines to a virtual switch. The private VLAN access list 20 is applied at the interfaces 35 so that private VLANs configured on one switch are restricted to that particular switch while allowing users associated with the same community VLAN to communicate with one another.

For implementation at a virtual switch, the components of the switch shown in FIG. 2 may reside at the VEM 14 on server 12A, 12B, or 12C, or one or more components may reside at the VSM 15 on an appliance or server (FIG. 1). As noted above, virtual machines 16 may migrate from one server to another server. In one embodiment, the VLAN access list 20 associated with the virtual machine 16 or virtual interface 35 migrates with the virtual machine.

Figure 3:
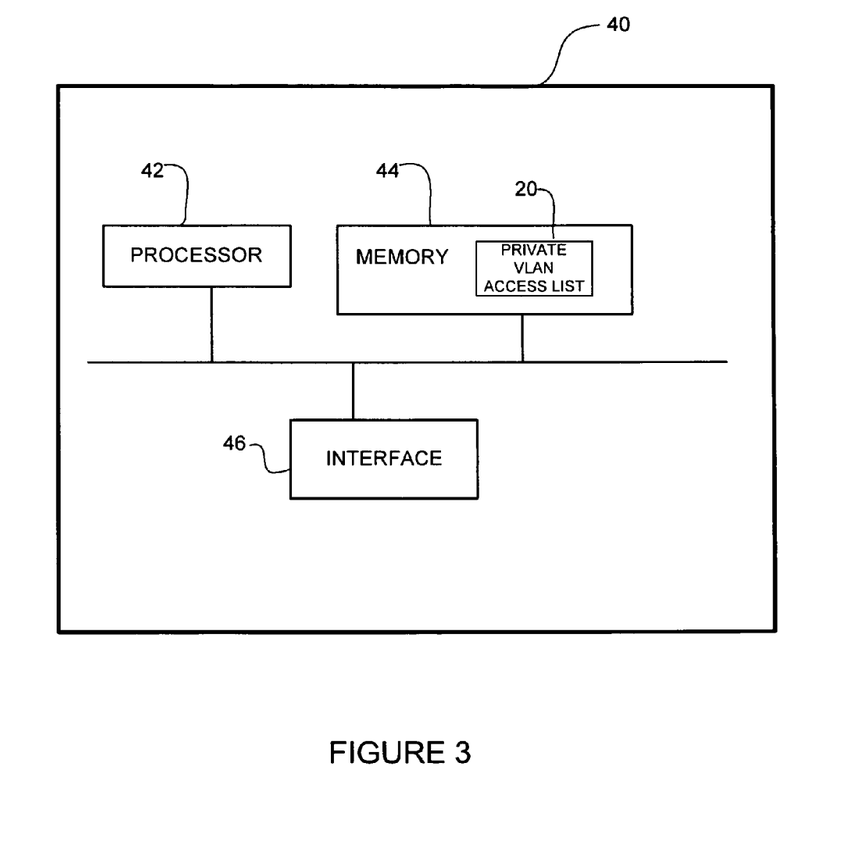
FIG. 3 depicts an example of a network device useful in implementing embodiments described herein.

An example of a network device (e.g., server, physical switch) 40 that may be used to implement embodiments described herein is shown in FIG. 3. In one embodiment, network device 40 is a programmable machine that may be implemented in hardware, software, or any combination thereof. The device 40 includes one or more processors 42, memory 44, and network interface 46. Memory 44 may be a volatile memory or non-volatile storage, which stores various applications, modules, and data for execution and use by the processor 42. For example, memory 44 may include VLAN access list 20, MAC address table, or other data structures.

Logic may be encoded in one or more tangible computer readable media for execution by the processor 42. For example, the processor 42 may execute codes stored in a computer readable medium such as memory 44. The computer readable medium may be, for example, electronic (e.g., RAM (random access memory), ROM (read-only memory), EPROM (erasable programmable read-only memory)), magnetic, optical (e.g., CD, DVD), electromagnetic, semiconductor technology, or any other suitable medium.

The network interface 46 may comprise one or more interfaces (linecards, ports) for receiving data or transmitting data to other devices. The interface 46 may include, for example, an Ethernet interface for connection to a computer or network.

It is to be understood that the network device shown in FIG. 3 and described above is only an example and that network devices having different components and configurations may be used without departing from the scope of the embodiments.

Referring again to FIG. 1, the virtual machines 16 are in communication with the virtual switch 14 via virtual network interface cards (VNICs) which connect to a virtual Ethernet interface at the virtual switch. The server 12A, 12B, 12C includes an Ethernet port for each physical network interface card. The Ethernet ports may be aggregated at a port channel. The virtual switches 14 are in communication with the network via the physical Ethernet interfaces. The virtual switch 14 switches traffic between the virtual machines 16 and the physical network interface cards.

A network administrator may assign a port group to the virtual network interface card. The port group may be defined by a port profile, which is used to define a common set of configuration policies (attributes) for multiple interfaces. The port profiles are associated with port configuration policies defined by the network administrator and applied automatically to a large number of ports as they come online in a virtual environment. In one embodiment, port profiles are used to associate the private VLAN access list 20 with one or more ports.

A MAC address is associated with each interface through means such as port security or static knowledge obtained from the underlying hypervisor. The virtual machine 16 may have more than one MAC address associated therewith, as permitted by user configuration for port security, for example. The distributed virtual switch uses this information to create the private VLAN access list 20 to associate the MAC addresses with ports using the same private VLAN configuration within that switch domain 18.

When a new virtual machine 16 is created and assigned to the same port profile or existing virtual machines use additional MAC addresses, the private VLAN access list 20 is automatically modified thereby allowing the virtual machines on a community VLAN to speak with one another, while still restricting traffic that could be broadcast to the other switch from reaching the virtual machines belonging to a different customer.

Figure 4:
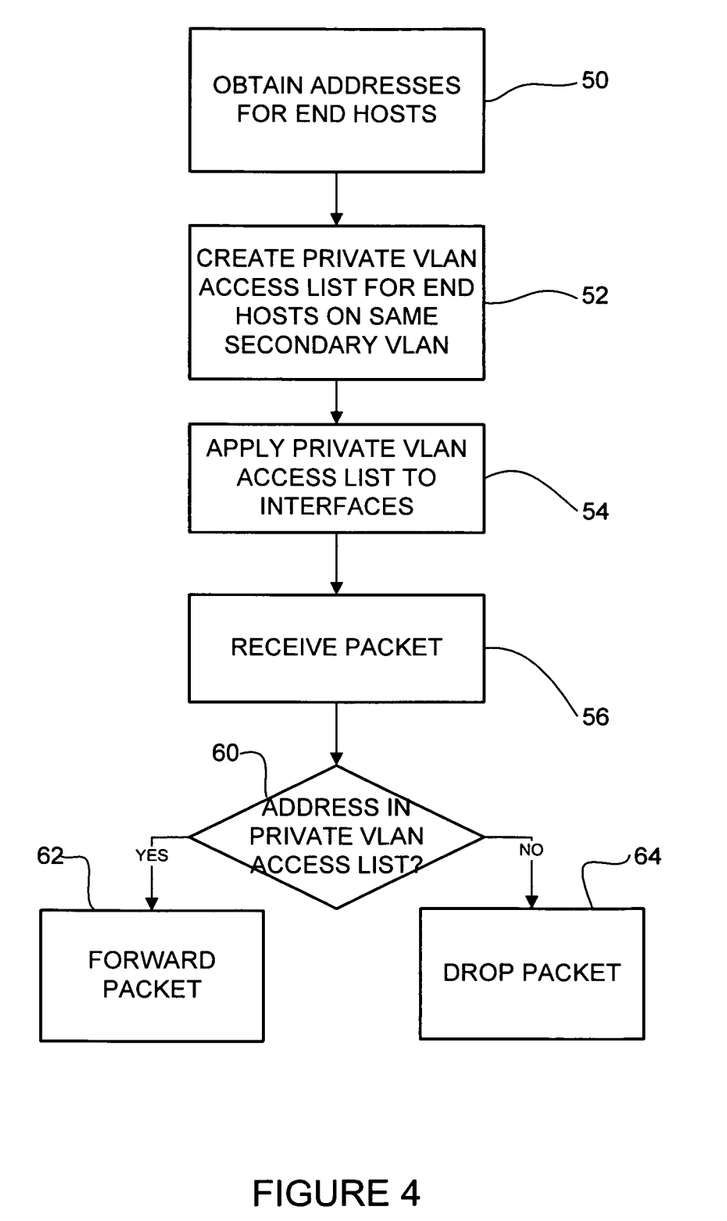
FIG. 4 is a flowchart illustrating an overview of a process for private virtual local area network isolation, in accordance with one embodiment.

FIG. 4 is a flowchart illustrating an overview of a process for private VLAN isolation, in accordance with one embodiment. At step 50, the switch obtains addresses (e.g., MAC addresses) of end hosts 16 (or interfaces 35). The addresses may be learned from traffic or bindings. For example, learning of MAC addresses associated with the ports may occur dynamically as messages are received at the switch. The MAC addresses and VLAN designations are stored in memory at the switch. The switch creates (or updates) VLAN access list 20 for end hosts 16 within the same community VLAN (step 52). The switch programs the interfaces 35 between the end hosts 16 and switch to accept or deny traffic according to the private VLAN access list 20 (step 54). When a packet is received at the interface 35 (step 56), the private VLAN access list 20 is checked to determine if the packet should be allowed (forwarded) (step 62) or denied (dropped) (step 64). For example, packets received at community port 32 may be delivered to the destination promiscuous port (based on destination address in packet and lookup at switch) or to any other community port designated as part of the same community VLAN as specified in the private VLAN access list 20.

It is to be understood that the process illustrated in FIG. 4 and described above is only an example and that steps may be modified, added, removed, or combined, without departing from the scope of the embodiments.

The following is an example of private VLAN access lists 20 created at two switches (switch domains). A first switch is configured with primary VLAN 100 and secondary VLAN 101 (community VLAN), and includes two virtual machines (VM1, VM2) 16. The two virtual machines on the first switch are associated with a customer X and need to communicate with one another on the secondary VLAN while being isolated from other customers. A second switch is also configured with primary VLAN 100 and secondary VLAN 101 (community VLAN), and includes two virtual machines (VM3, VM4). The virtual machines on the second switch are associated with a customer Y and need to communicate with one another while being isolated from other customers.

The customers enable configurations on the switches to (a) restrict the private VLAN domain to the virtual switch domain, and (b) share information on upstream gateway devices that the virtual machines need to be allowed to communicate with on the primary VLAN. In one embodiment, the customer may configure the system to isolate specified VLANs, while not isolating other VLANs across two switch domains.

Each switch automatically creates their private VLAN access list 20 based on the addresses learned from hypervisor or port security, for example. As discussed above, the private VLAN access list 20 may be attached to the port profile associated with the virtual interface 35 that the virtual machines 16 are connected to.

The private VLAN access list for the first switch is as follows:
  permit customer X VM1's MAC address
  permit customer X VM2's MAC address
  permit default gateway MAC address
  deny all The private VLAN access list for the second switch is as follows:
  permit customer Y VM3's MAC address
  permit customer Y VM4's MAC address
  permit default gateway MAC address
  deny all The private VLAN access lists 20 are automatically updated as new virtual machines are created and assigned to the same port profile or existing virtual machines use additional MAC addresses, as previously described.

Although the method and apparatus have been described in accordance with the embodiments shown, one of ordinary skill in the art will readily recognize that there could be variations made without departing from the scope of the embodiments. Accordingly, it is intended that all matter contained in the above description and shown in the accompanying drawings shall be interpreted as illustrative and not in a limiting sense.

What is claimed is:

1. A method comprising:
  obtaining at a virtual switch domain configured with a primary virtual local area network and a secondary virtual local area network, addresses of end hosts within said secondary virtual local area network, wherein the virtual switch domain comprises a network device comprising a virtual switch that is part of the distributed virtual switch;
  creating at the virtual switch domain, a private virtual local area network access list comprising said addresses of end hosts permitted to communicate on said secondary virtual local area network, wherein said private virtual local area network access list restricts communication on said secondary virtual local area network to said virtual switch domain; and
  applying said private virtual local area network access list to interfaces at the virtual switch domain connected to the end hosts permitted to communicate on said secondary virtual local area network to identify the end hosts within said secondary virtual local area network at the virtual switch domain;
  wherein the virtual switch domain is in communication with an upstream network device in communication with at least one other virtual switch domain comprising at least one other network device, the virtual switch domain and said at least one other virtual switch domain both configured with said primary virtual local area network, wherein said at least one other virtual switch domain is configured with a second secondary virtual local area network configured with a same virtual local area network identifier as said secondary virtual local area network and wherein communication between said secondary virtual local area network and said second secondary virtual local area network is restricted based on a check of said private virtual local area network access list when a packet is received at the virtual switch domain to provide private virtual local area network isolation across virtual switch domains.

2. The method of claim 1 wherein said addresses of end hosts comprise media access control addresses associated with said interfaces.

3. The method of claim 1 wherein the virtual switch domain comprises one or more virtual switches and the end hosts comprise virtual machines.

4. The method of claim 3 further comprising moving at least one of the virtual machines to a different network device, wherein said private virtual local area network access list applied to said interfaces is moved with the at least one virtual machine.

5. The method of claim 1 further comprising updating said private virtual local area network access list upon identifying a new end host permitted to communicate on said secondary virtual local area network.

6. The method of claim 1 wherein each of the end hosts is associated with said primary virtual local area network and one or more of the end hosts are associated with said secondary virtual local area network comprising a community virtual local area network or an isolated virtual local area network.

7. The method of claim 1 further comprising;
  receiving the packet at one of the interfaces of the virtual switch domain;
  checking said private virtual local area network access list; and
  determining whether to forward or drop the packet.

8. An apparatus comprising:
  a virtual switch domain configured with a primary virtual local area network and a secondary virtual local area network, wherein the virtual switch domain obtains addresses of end hosts within said secondary virtual local area network;
  memory for storing a private virtual local area network access list created at said virtual switch domain, wherein said private virtual local area network access list comprises said addresses of end hosts permitted to communicate on said secondary virtual local area network and restricts communication on said secondary virtual local area network to said virtual switch domain; and
  a processor for applying said private virtual local area network access list to interfaces at the virtual switch domain connected to the end hosts permitted to communicate on said secondary virtual local area network to identify the end hosts within said secondary virtual local area network at the virtual switch domain;
  wherein the virtual switch domain comprises a virtual switch that is part of a distributed virtual switch and wherein the virtual switch domain is in communication with an upstream network device in communication with at least one other virtual switch domain comprising at least one other network device, the virtual switch domain and said at least one other virtual switch domain both configured with said primary virtual local area network, wherein said at least one other virtual switch domain is configured with a second secondary virtual local area network configured with a same virtual local area network identifier as said secondary virtual local area network and wherein communication between said secondary virtual local area network and said second secondary virtual local area network is restricted based on a check of said private virtual local area network access list when a packet is received at the virtual switch domain to provide private virtual local area network isolation across virtual switch domain.

9. The apparatus of claim 8 wherein said private virtual local area network access list further comprises an address associated with said primary virtual local area network.

10. The apparatus of claim 8 wherein the processor is further configured for updating said private virtual local area network access list upon identifying a new end host permitted to communicate on said secondary virtual local area network.

11. The apparatus of claim 8 wherein the apparatus comprises one or more virtual switches and the end hosts comprise virtual machines.

12. The apparatus of claim 11 wherein said private virtual local area network access list applied to said interfaces is moved with one of the virtual machines when the one virtual machine moves to a different network device.

13. The apparatus of claim 8 wherein said secondary virtual local area network comprises a community virtual local area network or an isolated virtual local area network.

14. Logic encoded on one or more non-transitory computer readable media for execution and when executed configured to:
obtain, at a virtual switch domain configured with a primary virtual local area network and a secondary virtual local area network, addresses of end hosts within said secondary virtual local area network, wherein the virtual switch domain comprises a network device comprising a virtual switch that is part of a distributed virtual switch;
create, at the virtual switch domain, a private virtual local area network access list comprising said addresses of end hosts permitted to communicate on said secondary virtual local area network, wherein said private virtual local area network access list restricts communication on said secondary virtual local area network to said virtual switch domain; and
apply said private virtual local area network access list to interfaces at the virtual switch domain connected to the end hosts permitted to communicate on said secondary virtual local area network to identify the end hosts within said secondary virtual local area network at the virtual switch domain;
wherein the virtual switch domain is configured for communication with an upstream network device in communication with at least one other virtual switch domain comprising at least one other network device, the virtual switch domain and said at least one other virtual switch domain both configured with said primary virtual local area network, wherein said at least one other virtual switch domain is configured with a second secondary virtual local area network configured with a same virtual local area network identifier as said secondary virtual local area network, and wherein communication between said secondary virtual local area network and said second secondary virtual local area network is restricted based on a check of said private virtual local area network access list when a packet is received at the virtual switch domain to provide private virtual local area network isolation across virtual switch domains.

15. The logic of claim 14 wherein said addresses of end hosts comprise media access control addresses associated with said interfaces.

16. The logic of claim 14 wherein the virtual switch domain comprises one or more virtual switches and the end hosts comprise virtual machines.

17. The logic of claim 16 wherein said private virtual local area network access list applied to said interfaces is moved with one of the virtual machines when the one virtual machine moves to a different network device.

18. The logic of claim 14 wherein said logic is further configured to update said private virtual local area network access list upon identifying a new end host permitted to communicate on said secondary virtual local area network.

19. The logic of claim 14 wherein said secondary virtual local area network comprises a community virtual local area network or an isolated virtual local area network.

* * * * *